(12) United States Patent
Vrehen et al.

(10) Patent No.: US 11,942,990 B2
(45) Date of Patent: Mar. 26, 2024

(54) TUNABLE LASER BASED LIGHT SOURCE

(71) Applicant: SIGNIFY HOLDING B.V., Eindhoven (NL)

(72) Inventors: Joris Jan Vrehen, Waalre (NL); Hugo Johan Cornelissen, Escharen (NL); Chin Wan Oh, Eindhoven (NL); Johan-Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 18 days.

(21) Appl. No.: 17/911,443

(22) PCT Filed: Mar. 8, 2021

(86) PCT No.: PCT/EP2021/055720
§ 371 (c)(1),
(2) Date: Sep. 14, 2022

(87) PCT Pub. No.: WO2021/185608
PCT Pub. Date: Sep. 23, 2021

(65) Prior Publication Data
US 2023/0105180 A1 Apr. 6, 2023

(30) Foreign Application Priority Data
Mar. 17, 2020 (EP) .................................... 20163505

(51) Int. Cl.
*H04B 10/50* (2013.01)
*H04B 10/116* (2013.01)

(52) U.S. Cl.
CPC ......... *H04B 10/116* (2013.01); *H04B 10/503* (2013.01)

(58) Field of Classification Search
CPC .................................................. H04B 10/503
See application file for complete search history.

(56) References Cited

U.S. PATENT DOCUMENTS

| | | | |
|---|---|---|---|
| 6,278,538 B1 * | 8/2001 | Schleipen | H04N 1/129 348/E5.145 |
| 8,213,022 B1 | 7/2012 | Riza et al. | |

(Continued)

FOREIGN PATENT DOCUMENTS

| | | |
|---|---|---|
| EP | 3259615 A1 | 12/2017 |
| JP | 2012027909 A | 2/2012 |
| WO | 2016134321 A1 | 8/2016 |

OTHER PUBLICATIONS

Ton Koonen, "Indoor Optical Wireless Systems: Technology, Trends, and Applications", Journal of Lightwave Technology, vol. 36, No. 8, Apr. 15, 2018, pp. 1459-1467.

*Primary Examiner* — Nathan M Cors

(57) ABSTRACT

A tunable laser based light source for Li-Fi communication comprising a laser (1), a first optical element (3), and a second optical element (4). The first optical element (3) is configured to reflect and/or refract a scanning beam (2) emitted from the laser (1). The second optical element (4) is configured to broaden the scanning beam (2) reflected/refracted by the first optical element (3). The scanning beam (2) is configured to scan a scanning area extending with a first scanning length in a broadening direction (SI) and a second scanning length in a scanning direction (S2). The second optical element (4) is configured to broaden the scanning beam (2) in the broadening direction (S1) to a width larger than the first scanning length, and the laser (1) and the first optical element (3) are configured to cooperate to enable the scanning beam (2) to be swept along the scanning direction (S2).

13 Claims, 2 Drawing Sheets

(56) References Cited

U.S. PATENT DOCUMENTS

| | | | |
|---|---|---|---|
| 2004/0062469 A1* | 4/2004 | Ionov | H04B 10/11 |
| | | | 385/15 |
| 2014/0376001 A1* | 12/2014 | Swanson | G01S 7/4817 |
| | | | 356/479 |
| 2019/0250396 A1 | 8/2019 | Blanche et al. | |
| 2019/0317199 A1 | 10/2019 | Chong | |
| 2019/0334618 A1 | 10/2019 | McLaurin et al. | |
| 2020/0083957 A1* | 3/2020 | Maierbacher | H04W 76/10 |
| 2022/0146903 A1* | 5/2022 | Watts | H04B 10/1123 |

* cited by examiner

TUNABLE LASER BASED LIGHT SOURCE

CROSS-REFERENCE TO PRIOR APPLICATIONS

This application is the U.S. National Phase application under 35 U.S.C. § 371 of International Application No. PCT/EP2021/055720, filed on Mar. 8, 2021, which claims the benefit of European Patent Application No. 20163505.9, filed on Mar. 17, 2020. These applications are hereby incorporated by reference herein.

FIELD OF THE INVENTION

The invention concerns a tunable laser based light source for Li-Fi communication.

BACKGROUND OF THE INVENTION

Light fidelity (Li-Fi) has become an emerging technology within wireless communication technology. Li-Fi systems are capable of high data transmission speeds and have large bandwidth, thereby reducing the risk of interference from other sources. Though the risk of interference still exists within Li-Fi systems, especially if several devices are operating on the same Li-Fi system.

For example, an office environment may have several access points each illuminating several square meters, to achieve sufficient coverage. Devices capable of communicating with these access points may also illuminate an area of several square meters to ensure contact is established with at least one access point. Devices connected to the same access point will share the bandwidth of that access point, though in some cases the devices will be connected to more than one access point, which may result in unnecessary interference. Interference to an access point results in a lower bandwidth, which is especially not desirable as the demand for higher data rates is expected to rise.

To avoid the problem with interference, point to point communication has been suggested for Li-Fi systems. Point to point communication relies on narrow beams, to only illuminate small areas, and is specifically aimed at points of interest. Aiming of the beam may be carried out with mirrors or gratings adjusting the narrow beams. In Ton Koonen "*Indoor Optical Wireless Systems: Technology, Trends, and Applications*" JOURNAL OF LIGHTWAVE TECHNOLOGY, VOL. 36, NO. 8, pp 1459-1467, Apr. 15, 2018, a passive 2-dimensional set-up for steering of the narrow beams is explained, in the set-up two gratings are used in conjunction with a wavelength tunable laser, to achieve steering of the narrow beam.

However, these systems relying on point to point communication still have several flaws, steering of the narrow beam using two grating is a complicated set-up, which may require a high degree of scanning before achieving a lock for enabling point to point communication.

SUMMARY OF THE INVENTION

It is an object of the present invention to overcome these problems, and to provide a tunable laser based light source, which overcomes or at least alleviates the problems of the prior art, and which thus has reduced scanning time and is simple to set-up.

According to a first aspect of the invention, this and other objects are achieved by a tunable laser based light source for Li-Fi communication comprising a laser for in operation emitting a scanning beam, a first optical element configured to reflect and/or refract the scanning beam emitted from the laser, and a second optical element configured to broaden the scanning beam reflected/refracted by the first optical element, wherein the scanning beam is configured to scan a scanning area, wherein the scanning area is extending with a first scanning length in a broadening direction and a second scanning length in a scanning direction, wherein the broadening direction and the scanning direction are mutually perpendicular, wherein the second optical element is configured to broaden the scanning beam in the broadening direction to a width larger than the first scanning length, and wherein the laser and the first optical element are configured to cooperate to enable the scanning beam to be swept along the scanning direction.

Providing a tunable laser based light source for Li-Fi communication with a broadened scanning beam enables for a more continuous scanning behavior of the tunable laser based light source. When having a scanning beam broadened to a width larger than a first scanning length it allows for only one-dimensional scanning with the scanning beam to be needed. Thereby the degrees of freedom involved when scanning with the scanning beam is reduced, thereby in turn reducing the complexity associated with scanning with the scanning beam. Furthermore, since the scanning beam only needs to scan in one-dimension, higher scanning speeds may be achieved, which is of particular interest for high-speed Li-Fi systems.

In the context of the invention, the term scanning beam denotes any beam usable for scanning. The scanning beam may have a fixed wavelength or a tunable wavelength.

In the context of the invention, the term scanning area denotes an area to be scanned by the scanning beam. In an embodiment the laser is a wavelength tunable laser and the first optical element is a diffraction grating, thereby allowing the scanning beam reflected/refracted to be swept along the scanning direction when the wavelength is changed.

Sweeping the scanning beam by changing the wavelength of the laser eliminates the need for moving parts, which in return reduces the risk of mechanical malfunctions, and minimizes noise during operation. Furthermore, the wavelength of the laser may be changed almost continuously giving a high scanning resolution along the scanning direction. The diffraction grating may be a reflective diffraction grating or a transmission grating.

In an embodiment, the first optical element is a blazed grating.

Usage of a blazed grating may assure maximum grating efficiency is achieved for a particular diffraction order. This is advantageous for the broadened scanning beam to ensure the scanning beam is not to diffuse when swept along the scanning direction.

In an embodiment, the first optical element is a rotatable and/or deformable grating configured to reflect the scanning beam and broaden the scanning beam in the broadening direction.

The broadening of the beam in the first direction is thereby variable by the movement of the grating. This may be used for both broadening the scanning beam and focusing the scanning beam. Furthermore, the narrowing of the scanning beam may be used to zoom-in to a receiver to establish an improved data connection. When searching for a data connection a broad beam is desired to reduce the scan time, but once a connection is established a narrow beam may be desired as it concentrates more power onto the receiver which improves the signal-to-noise ratio.

In an embodiment, the first optical component and the second optical component are the same optical component.

Providing the features of broadening and sweeping of the scanning beam in the same optical component may facilitate a compact system.

In an embodiment, the laser is a fixed spectrum laser and the first optical element is a rotatable mirror configured to reflect the scanning beam and sweep the scanning beam by rotation along the scanning direction.

Usage of a fixed spectrum laser and a pivotable mirror is a cheap and easy to manufacture set-up. The pivotable mirror may be a micro-electrical-mechanical system (MEMS) device, or a galvano mirror.

In an embodiment, the second optical element is a broadening lens extending in the broadening direction and longitudinally in the scanning direction, wherein a curvature of the broadening lens in the scanning direction is substantially zero.

Providing a lens for broadening gives a simple to manufacture system. The lens may assume a wide variety of geometric shapes, such as biconvex, planoconvex, planoconcave, or biconcave.

In an embodiment, the tunable laser based light source comprises a third optical element arranged such that the scanning beam emitted from the laser passes through the third optical element before being reflected/refracted by the first optical element, said third optical element comprising collimator optics for collimating the scanning beam.

Collimating the scanning beam before reflecting and broadening it, may assure the beam is focused allowing for a longer signal range of the scanning beam.

In an embodiment, the third optical element is configured for collimating the scanning beam in the scanning direction.

Collimation of the scanning beam in the scanning direction minimizes the loss of scanning resolution in the scanning direction.

In an embodiment, the tunable laser based light source further comprises a casing and the laser, the first optical element, and the second optical element are integrated with the casing.

Integrating the optical components with a casing assures the tunable laser based light source is easy to transport and compact in size. Furthermore, a casing may provide protection for the optical components assuring the system is not contaminated by dust and other particles. Integrating components with a casing may also help in reducing calibration time for the tunable laser based light source when moving it, adjusting to a new receiver, or implementing it in a system, since all the optical components may be moved collectively without moving the optical components separately.

In an embodiment, the casing comprises a light exit window for transmitting light, wherein a part of the light exit window is formed to define the broadening lens.

Further integrating the broadening lens into the light exit window of the casing may allow for a compact tunable laser based light source.

In an embodiment, the broadening lens is arranged to extend such that the broadening direction extends, in parallel with a direction in which the laser emits the scanning beam, or perpendicular to the direction in which the laser emits the scanning beam.

In particular having the broadening lens extending with the broadening direction perpendicular to the direction in which the laser emits the scanning beam, may be advantageous. Since it may allow for a narrow casing, as it allows for the broadening lens to extend longitudinally in parallel with the direction in which the laser emits the scanning beam.

According to a second aspect of the invention, the invention relates to a Li-Fi system comprising a tunable laser based light source according to the first aspect of the invention.

It is noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
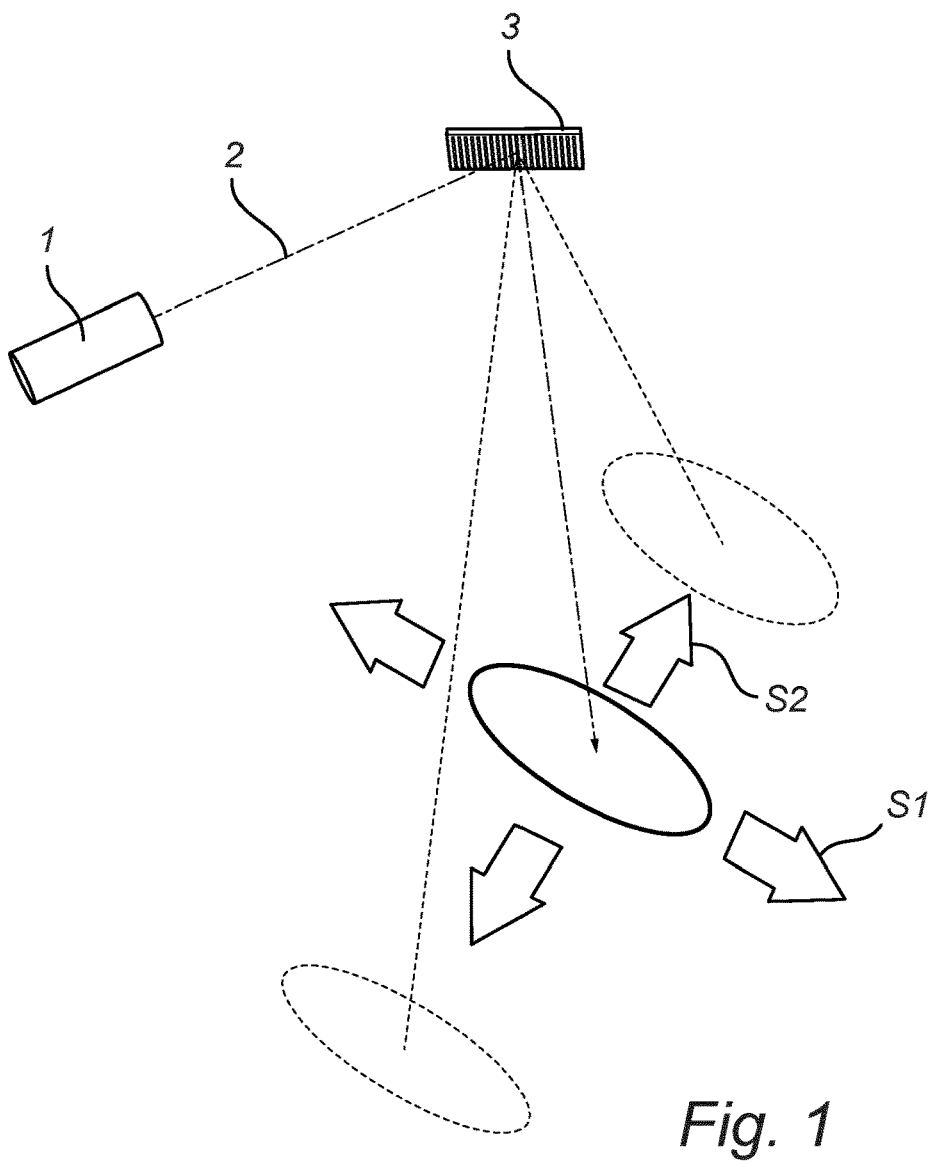
FIG. 1 shows a schematic drawing of the principle of the invention.

Referring initially to FIG. 1, a schematic drawing of the principle of the invention is shown. A laser 1 is emitting a scanning beam 2, which is reflected of a first optical element 3. The laser 1 may be fixed wavelength laser or tunable wavelength laser. The first optical element 3 may be a diffraction grating, a mirror or a deformable grating. The cooperation between the laser 1 and the first optical element 3 allows for the scanning beam 2 to be swept in a scanning direction S2. Not shown on FIG. 1 is a second optical element configured to broaden the scanning beam 2. The second optical element is configured to broaden the scanning beam 2 reflected off the first optical element 3. In particular, the second optical element is configured to broaden the scanning beam 2 along a broadening direction S1. Sweeping of the broadened scanning beam 2 in the scanning direction S2, then allows for the scanning beam 2 to scan a scanning area extending along the broadening direction S1 and the scanning direction S2. In particular, the second optical element is configured for broadening the scanning beam to a width larger than the width of the scanning area along the broadening direction S1.

In another embodiment the sweeping and broadening of the scanning beam 2 may be achieved by the same optical element. This can for instance be done by providing a deformable grating that can tilt and/or vary shape, e.g. from flat to cylindrically, concave or convex. The tilting and/or the deforming of the grating may then be used for broadening or narrowing of the scanning beam 2, and the sweeping of the broadened scanning beam may be done by tuning the wavelength of the scanning beam 2. The first optical element 3 and the second optical element 4 may then be collected into a single optical component.

Figure 2:
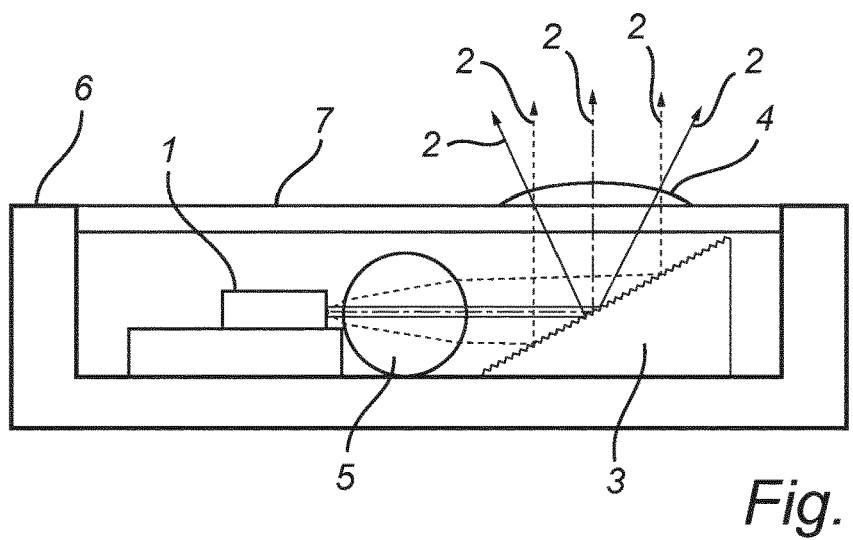
FIG. 2 shows a schematic cross-sectional view of a first embodiment of the invention, wherein the optical components have been integrated with a casing.

Referring to FIG. 2, which depicts a schematic cross-sectional view of a first embodiment of the invention, the optical components have been integrated with a casing 6. The laser 1, the first optical element 3, and the second optical element 4 have all been integrated with the casing 6. Furthermore, a third optical element 5 has also been integrated with the casing 6. The third optical element 5 is in the shown embodiment a collimator. The third optical element 5 is arranged in-between the laser 1 and the first optical element 3. The laser 1 is emitting the scanning beam 2 which passes through the third optical element 5, thereby parallelly aligning the scanning beam 2 before being reflected off the first optical element 3. The first optical element 3 is an echelle grating. After being reflected off the first optical element 3 the scanning beam 2 passes through the light exit window 7 of the casing 6. The light exit window 7 is preferably made from an optically transparent material, to limit the losses of the scanning beam 2 passing through the light exit window 7. In the shown embodiment a part of the light exit window has been formed to define the second optical element 4. The second optical element 4 is a broadening lens with a planoconvex geometry. The scanning beam 2 passing through the second optical element 4 is broadened. The laser 1 in the shown embodiment is a wavelength tunable laser. By changing the wavelength of the laser 1, the scanning beam reflected of the second optical element 3 is reflected in different directions. Thereby a scanning mechanism is obtained by the cooperation between the laser 1 and the first optical element 3. Although the scanning beam 2 is shown to be reflected off an echelle grating, in other embodiments other types of refraction or diffraction gratings may be used for refracting or reflecting the scanning beam 2 by the grating.

Figure 3:
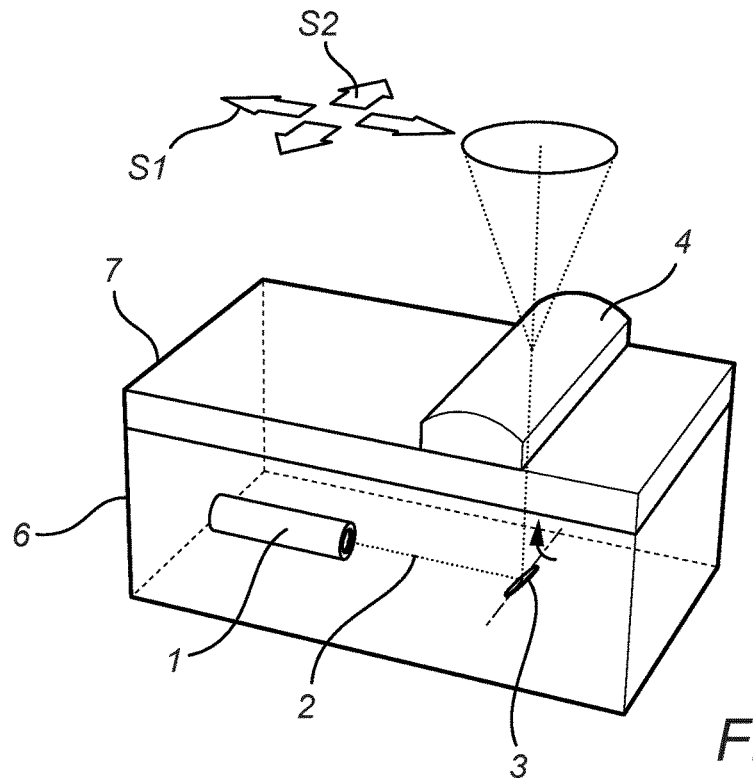
FIG. 3 shows a schematic perspective view of a second embodiment of the invention, wherein the optical components have been integrated with a casing.

Referring to FIG. 3, which shows a schematic perspective view of a second embodiment of the invention, the optical components 3 and 4 have been integrated with a casing 6. In contrast to the first embodiment of the invention, cf. FIG. 2, the scanning mechanism is not obtained by a wavelength tunable laser cooperating with a diffraction grating. Instead the laser 1 is a fixed wavelength laser and the first optical element 3 is a rotatable mirror. By reflecting the scanning beam 2 emitted from the laser 1 off the first optical element 3, while rotating the first optical element 3 a scanning mechanism is obtained, thereby allowing the scanning beam 2 to be scanned along the scanning direction S2. The first optical element 3 is capable of rotating around an axis of rotation parallel to the broadening direction S1. The second optical element 4 is a lens configured to broaden the scanning beam 2 along the broadening direction S1. The lens is formed as part of the light exit window 7 of the casing 6. The lens extends longitudinally in parallel with the scanning direction S2, and perpendicular to the direction in which the laser 1 emits the scanning beam 2. Furthermore, the curvature of the lens in the scanning direction S2 is substantially zero. The substantially zero curvature ensures the scanning beam 2 is not broaden in the scanning direction S2, assuring resolution is not lost along the scanning direction S2.

Figure 4:
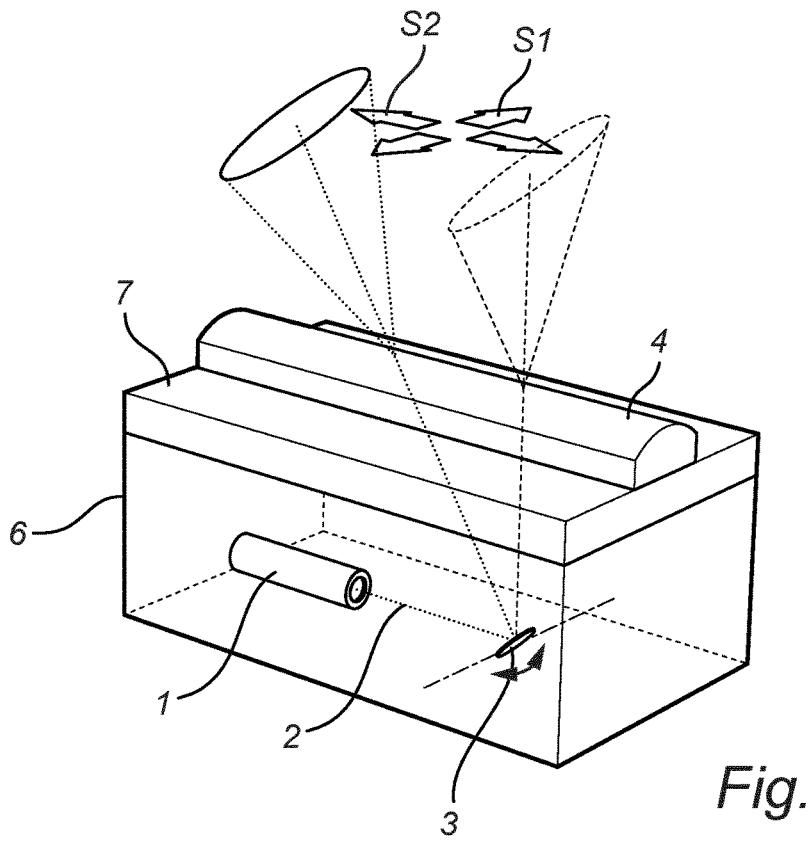
FIG. 4 shows a schematic perspective view of a third embodiment of the invention, wherein the optical components have been integrated with a casing.

Referring to FIG. 4, which shows a schematic perspective view of a third embodiment of the invention, the first optical elements 3 and the second optical element 4 have been integrated with a casing 6. The third embodiment is similar to the second embodiment, with the change that the second optical element 4 which is a broadening lens has been rotated 90 degrees. The rotation of the broadening lens 4 results in the broadening lens extending longitudinally in parallel with the scanning direction S2, and in parallel with the direction in which the laser 1 emits the scanning beam 2.

The person skilled in the art realizes that the present invention by no means is limited to the preferred embodiments described above. On the contrary, many modifications and variations are possible within the scope of the appended claims. For example, even though only a lens has been mentioned as the second optical component, reflectors or other optical components may also be used for widening the scanning beam in the broadening direction. The invention is also not limited to the optical components mentioned herein, but several other optical components may be incorporated, such as beam splitters or phase modulators. These other optical components may be placed in-between the laser and the first optical component, in-between the first optical component and the second optical component, and/or after the second optical component.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A tunable laser based light source for Li-Fi communication comprising:
   a laser for emitting, in operation, a scanning beam,
   a first optical element configured to reflect and/or refract the scanning beam emitted from the laser, and
   a second optical element configured to broaden the scanning beam reflected/refracted by the first optical element,
   wherein the scanning beam is configured to scan a scanning area,
   wherein the scanning area is extending with a first scanning length in a broadening direction and a second scanning length in a scanning direction,
   wherein the broadening direction and the scanning direction are mutually perpendicular,
   wherein the second optical element is configured to broaden the scanning beam in the broadening direction to a width larger than the first scanning length, and
   wherein the laser and the first optical element are configured to cooperate to enable the scanning beam to be swept along the scanning direction.

2. The tunable laser based light source according to claim 1, wherein the laser is a wavelength tunable laser and the first optical element is a diffraction grating, thereby allowing the scanning beam reflected to be swept along the scanning direction when the wavelength is changed.

3. The tunable laser based light source according to claim 2, wherein the first optical element is a blazed grating.

4. The tunable laser based light source according to claim 2, where the first optical element is a rotatable and/or deformable grating configured to reflect the scanning beam and broaden the scanning beam in the broadening direction.

5. The tunable laser based light source according to claim 1, wherein the first optical component and the second optical component are the same optical component.

6. The tunable laser based light source according to claim 1, wherein the laser is a fixed spectrum laser and the first optical element is a rotatable mirror configured to reflect the scanning beam and sweep the scanning beam by rotation along the scanning direction.

7. The tunable laser based light source according to claim 1, wherein the second optical element is a broadening lens extending in the broadening direction and longitudinally in the scanning direction, wherein a curvature of the broadening lens in the scanning direction is substantially zero.

8. The tunable laser based light source according to claim 1, and comprising a third optical element arranged such that the scanning beam emitted from the laser passes through the third optical element before being reflected/refracted by the first optical element, said third optical element comprising collimator optics for collimating the scanning beam.

9. The tunable laser based light source according to claim 8, said third optical element being configured for collimating the scanning beam in the scanning direction.

10. The tunable laser based light source according to claim 1, the tunable laser based light source further comprising a casing, and wherein the laser, the first optical element, and the second optical element are integrated with the casing.

11. The tunable laser based light source according to claim 7, said casing comprising a light exit window for transmitting light, wherein a part of the light exit window is formed to define the broadening lens.

12. The tunable laser based light according to claim 1, said broadening lens is arranged to extend such that the broadening direction extends:
   in parallel with a direction in which the laser emits the scanning beam, or
   perpendicular to the direction in which the laser emits the scanning beam.

13. A Li-Fi system comprising the tunable laser based light source according to claim 1.

* * * * *